1. The bolt $b$, having a flange, pin, or projection, $d$, formed upon its side, in combination with the rotating slotted sleeves C 5 and their slides, all substantially as and for the purposes set forth.

2. The combination of revolving slotted sleeves and sliding locking devices with the rotating wheels $e$ 7, having teeth cut upon their inner surfaces, into which the locking devices catch to hold the wheels in position on the sleeves when the combination is set, all substantially as set forth.

3. The spring-pin $o$ upon the guard on the outer side of the lock-frame, in combination with the notched flange $g$ on the revolving wheel $e$, having studs or projections on its periphery, all substantially as set forth.

4. The wheel $e$, having studs or projections upon its periphery which are distinguishable by the touch, having letters or figures and grooves, notched or toothed flange $g$ on its side, and teeth or notches upon its inner surface, all substantially as and for the purposes set forth.

5. The combination of the hook or stop K, and pivoted to the inner face of the lock-frame, which serves to lock the bolt on the inside, prevents it from being moved too far back to allow the combination to be changed, and prevents the flange $d$ on the bolt $b$ from leaving the slots in the sleeves when desired to use the bolt as a latch, with the pin $h$ attached to the bolt $b$, and extending through a slot in the lock-frame, all substantially as and for the purposes set forth.

6. The combination, with the bolt $b$ and flange $d$, of the wheel $e$, extending through the lock-frame, and having pin $i$, the interior corrugated wheel 7 with pin 9, the spring $l$, the slotted sleeves C 5, and the locking-slides 8 4, all constructed and operating substantially as herein set forth.

In testimony that I claim the foregoing I have hereunto set my hand this 19th day of August, 1873.

PHIDELLO W. HALL.

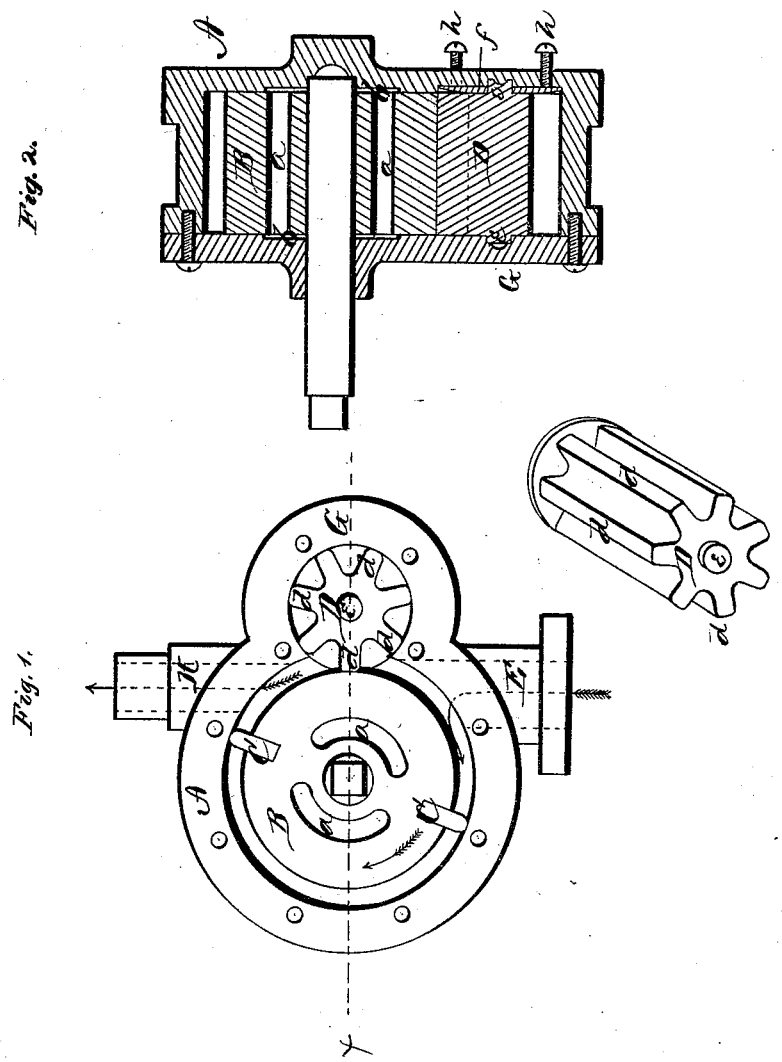

Witnesses:
A. N. MARR,
F. L. OURAND.